United States Patent [19]

Audenard et al.

[11] 3,864,638

[45] Feb. 4, 1975

[54] HIGH SPEED PHASE METER

[75] Inventors: Bernard Audenard, Seclin; Michel Pigeon, Bures-Sur-Yvette; Claude Stach, Faches-Thomesnil, all of France

[73] Assignee: Commissariat a l'Energie Atomique, Paris, France

[22] Filed: July 24, 1973

[21] Appl. No.: 382,053

[30] Foreign Application Priority Data

Aug. 3, 1972 France .............................. 72.28120

[52] U.S. Cl. ................. 328/134, 328/118, 328/150, 328/151, 328/185

[51] Int. Cl. ................................................ H03b 3/04

[58] Field of Search ........... 328/134, 151, 186, 118, 328/185, 150

[56] References Cited

UNITED STATES PATENTS

| | | | |
|---|---|---|---|
| 3,534,399 | 10/1970 | Hirsch | 328/151 X |
| 3,548,321 | 12/1970 | Duquensne | 328/118 X |
| 3,567,971 | 3/1971 | Goldsworthy | 328/151 X |
| 3,723,888 | 3/1973 | Ellis | 328/134 |

*Primary Examiner*—John S. Heyman
*Attorney, Agent, or Firm*—Cameron, Kerkam, Sutton, Stowell & Stowell

[57] ABSTRACT

The phase meter comprises a sweep waveform generator controlled by the shaped reference signal (V ref), a first and a second memory sampler for sampling said sweep waveform, a directional logic unit controlled by the reference signal and the shaped signal ($V\phi$) to be scanned, which delivers two signals for controlling the samplers and a logical phase-shift direction signal, a sign-changing circuit controlled by the directional logic unit and by the second sampler so as to deliver an analog signal ($V = \pm k\phi$) which is representative of the value and sign of the phase shift after one sinusoidal cycle between the reference signal (V ref) and the signal ($V\phi$) to be scanned, an analog gate controlled by the analog signal and by a signal for controlling the peak of the modulus of the signal to be scanned in order to block the output signal when the modulus is smaller than a predetermined value.

8 Claims, 5 Drawing Figures

HIGH SPEED PHASE METER

This invention relates to a high-speed phase meter which can be employed in a device for controlling alarm systems as a function of the modulus and phase of a pulse in instruments for nondestructive testing of materials, especially instruments which operate on the eddy-current principle and serve to detect flaws of ever-decreasing size in materials and particularly in tubes.

One known method of detection samples a periodic signal to be studied on the one hand each time a reference signal passes through 0 in at least one of the increasing and decreasing directions of its amplitude and on the other hand each time said reference signal passes through at least one of the positive and negative peak values of its amplitude; it is thus possible to obtain two series of successive sampled signals which are representative of the successive values of the components of the periodic signal to be studied in phase and in quadrature with the reference signal.

A device for carrying out this method comprises at least one sampling circuit to which the periodic signal to be studied is applied and which is essentially constituted by a memory amplifier, by a storage switch and by at least one shaping circuit to which the reference signal is applied, said circuit being coupled to the storage switch and intended to deliver circuit-closing sample pulses of small width each time the reference signal passes through 0 in at least one of the increasing and decreasing directions of its amplitude and through at least one of the positive and negative peaks of said amplitude.

The method and detection circuit which have been set forth in the foregoing find an application in devices for measuring the components of a periodic signal in phase and in quadrature with respect to a reference signal having the same frequency. It is also a known practice to make use in a nondestructive eddy-current testing device, for example, of a method which achieves distinctly enhanced resolution and consists in supplying through an oscillator, two coils (or probes) which are mounted in a differential manner in the adjacent arms of an alternating-current electric-balance bridge and in adding to the signal delivered by the bridge and in two detection channels, two signals in phase and in quadrature which are derived from a 90° phase shifter and are formed from the signal which is delivered to the coils (or probes) and thus constitutes a reference signal. The signals delivered by the detection channels are applied to the horizontal and vertical deflection channels of an oscilloscope on which is displayed a Lissajous figure, the shape of which characterizes the signal delivered by the bridge when a defect is detected in the object being tested.

It is also possible to carry out the same analysis by means of a device whereby the components in phase and in quadrature of the signal being studied can be extracted directly and without alteration from the reference signal constituted by the signal delivered to the coils, this being achieved by virtue of the above-mentioned method of detection. Moreover, the frequency of analysis can be selected continuously over a wide band, thereby permitting a continuous deep analysis of the object being tested. Finally, the device serves to bring out a parameter which appears in any phase by rotation of the displayed impedance plane with respect to the reference axes XOY of the oscilloscope.

One object of this invention consists in making use of a defect signal to be analyzed (V $\phi$) as supplied by an eddy-current testing instrument of known type and a reference signal (V ref) supplied by the oscillator of the same instrument, in producing in a phase meter an analog signal whose amplitude is proportional to the phase shift between these two periodic signals within a range of + to −180°.

The phase meter in accordance with the invention is characterized in that it comprises:

- a sweep waveform generator controlled by the shaped reference signal (V ref), a first and a second memory sampler which sample said sweep waveform,
- a directional logic unit controlled by the reference signal and the shaped signal to be scanned (V $\phi$) which delivers two signals for controlling the samplers so as to produce a logical signal for the direction of the phase shift,
- a sign-changing circuit controlled by the directional logic unit and by the second sampler so as to deliver an analog signal ($V = \pm k\phi$) which is representative of the value and sign of the phase shift after transition through a sinusoidal cycle between the reference signal (V ref) and the signal to be scanned (V $\phi$),
- an analog gate controlled by said analog signal and by a signal for controlling the peak of the modulus of the signal to be scanned in order to block the output signal when the modulus is smaller than a predetermined value.

In accordance with the invention, the phase meter comprises a sweep generator having an origin OV at a constant voltage over a half-period ($\pi$) of the reference signal (V ref) irrespective of the scanning frequency. The linear value which is representative of an angle from 0 to $\pi$ plotted as abscissae is thus obtained on the vertical axis representing the voltage.

The sweep waveform is obtained from the reference signal (V ref) which is detected at the point of transition of the sine-wave through 0 and re-shaped by a high-speed precision comparator. This comparator triggers a sweep waveform during one half-period, the amplitude of said sweep waveform being read by a variable-coefficient comparator which controls the height of said waveform.

The (phase-shifted) signal V $\phi$ to be scanned is re-shaped by a comparator which is identical with that of the reference signal and samples the sweep waveform during its half-period. An overlap of the half-periods, namely one of thw sweep waveform and the other of the opening of the sampler is therefore obtained independently of the phase-shift sign, with the result that a direct-current voltage which is representative of the phase appears at the sampler output.

Since the sweep waveform is generated over an angle of 180°, it is necessary in order to obtain a phase up to 360° to attribute a sign to the sampled value and thus to achieve ± 180° as a final result.

A directional logic unit based on the reading of the complemented or uncomplemented states at the given instant 0 or 180° of the input signals serves to produce within a sign-changing circuit an analog signal which is proportional to the phase of the anomaly within a range of ± 180°.

The analog gate controlled by the peak value of the modulus of the signal V $\phi$ delivers an analog signal when the signal to be scanned exceeds a predetermined value. This signal can be employed in an alarm-signal control device employed in instruments for the nondestructive testing of materials by means of eddy currents.

The following description relates to examples of construction and refers to the accompanying drawings, wherein.

Figure 1:
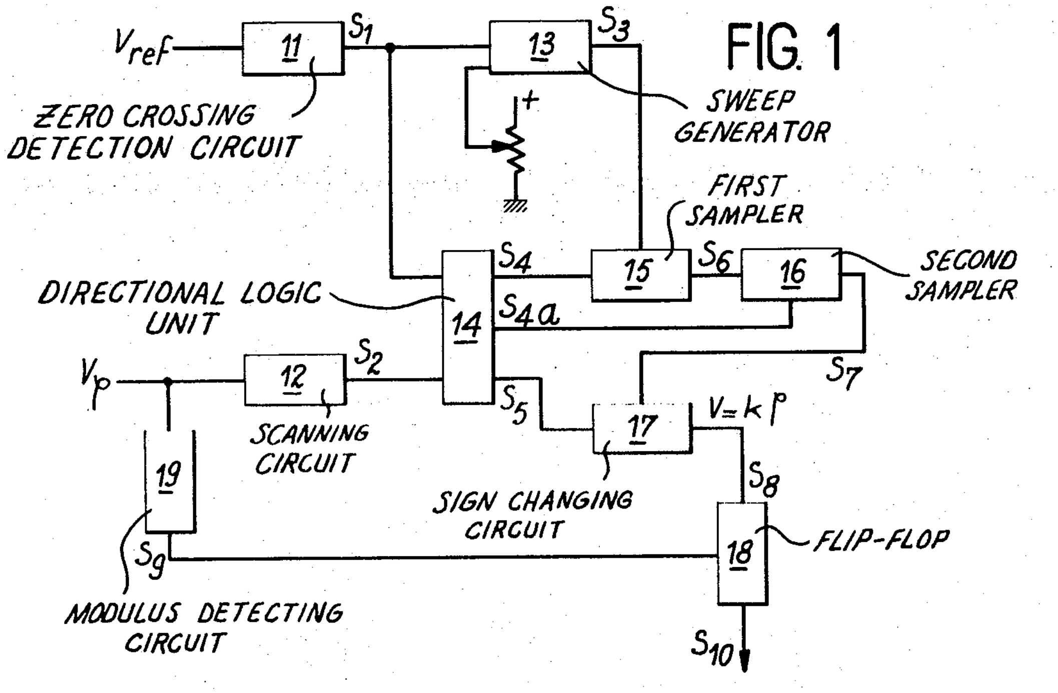
- FIG. 1 is a block diagram which illustrates the general arrangement of the phase meter in accordance with the invention.

In FIG. 1, a reference signal V ref and a signal V $\phi$ to be scanned are applied to the inputs of the phase meter in accordance with the invention. These signals are generated by a basic circuit (not shown) which is usually employed in eddy-current nondestructive testing instruments.

In FIG. 1, the reference signal V ref is shaped by a zero-crossing detection circuit 11. The corresponding signal $S_1$ at the output of the circuit 11 is applied on the one hand to a sweep generator 13 and on the other hand to one input of a directional logic unit 14.

Figure 3:
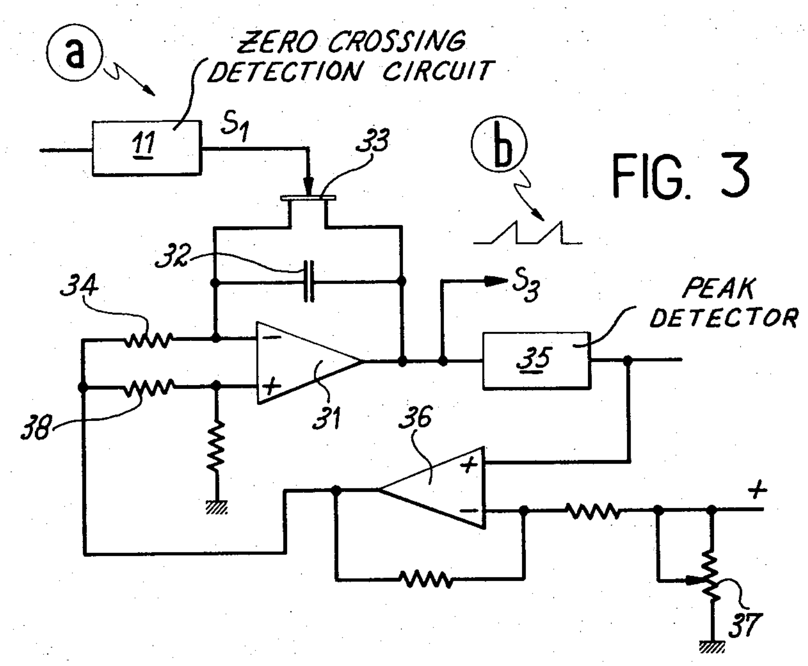
- FIG. 3 is a general arrangement diagram of a constant-amplitude sweep waveform generator of the phase meter.

The sweep generator 13 which is shown in detail in FIG. 3 makes use of an operational amplifier 31 mounted as a sweep generator or in other words as an integrating circuit. The loop capacitor 32 of the amplifier 31 is short-circuited through a field-effect transistor 33 which is controlled by the signal V ref during one half-period. During the opening time, the capacitor 32 is charged at constant current through a resistor 34. The signal after passing through a peak detector 35 is then compared within the comparator 36 with an adjustable direct-current signal which defines the height of the sweep waveform. This direct-current signal can be obtained by means of a supply which is integrated with the comparator and comprises a potentiometer 37. The error signal at the output of the comparator 36 is fed back through the resistor 38 to the input of the amplifier 31, with the result that the increase or decrease in the peak value of the sweep waveform restores the amplitude of the sweep signal to the value of the direct-current signal which is adjustable by means of the potentiometer 37. If the ratio of frequency variation were to become greater than 1 to 10, switching of the capacitor 32 would become necessary.

The sweep generator 31 accordingly delivers a sawtooth signal S3 (as shown in FIG. 3*b*), the amplitude of which remains constant and adjustable; this signal has the same recurrence frequency as the reference signal and a width which is equal to one half-period of the signal just mentioned.

Figure 4:
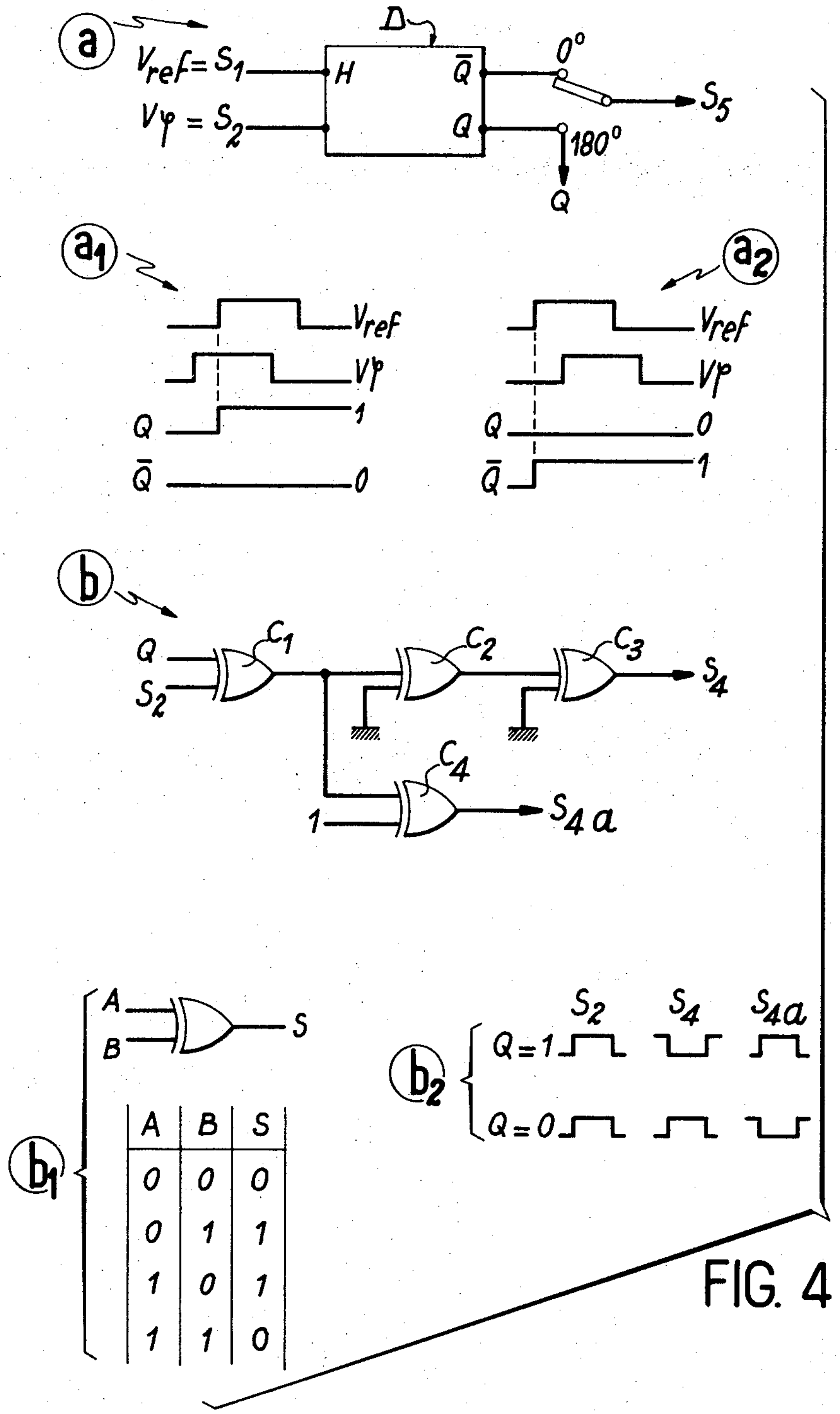
- FIG. 4 is a general arrangement diagram of a directional logic unit of the phase meter.

The directional logic unit 14 of FIG. 1 is shown in detail in FIG. 4. This unit comprises two separate circuits for producing on the one hand a logical signal S5 which gives the sign of the phase shift and on the other hand the sampler control signals S4 and S4*a*.

The first circuit shown in FIG. 4*a* makes use of a flip-flop D which displays at its output Q a state 0 or 1 corresponding to that of its input *d* to which is applied the signal S2 derived from the shaping of the signal V $\phi$ to be scanned by the circuit 12 and when the signal S1 changes to the level 1 at the input H. The diagram of FIG. $4a_1$ shows that the flip-flop D is in state 1 when the signal V $\phi$ is in phase lag and is in state 0 (as shown in FIG. $4a_2$) when said signal is in phase lead. A switching element placed at the outputs of the flip-flop D produces a reference signal $S5 = 0$ (output on the terminal Q which is the complement of Q) towards the sign-changing circuit (FIG. 1) or permits a phase shift of 180° on one input Q of the flip-flop $C_1$ (FIG. 4*b*).

The second circuit which is shown in FIG. 4*b* of the directional logic unit (shown in FIG. 1) makes use of exclusive-OR logic circuits, the truth-table of which is represented in FIG. $4b_1$. The first circuit $C_1$ forms a complement S4*a* when $Q = 1$ (output of the previous circuit) and a direct output S4 when $Q = 0$. The two following circuits $C_2$ and $C_3$ are employed only for the purpose of producing a time-lag in order that the memory of the sampler 16 should be blocked before the sampler 15 is available. The circuit $C_4$ is mounted as an inverter.

The state of the circuits during operation is illustrated by FIG. $4b_2$:

| Inputs $C_1$ | Output $C_3$ input of the first sampler 15 | Output $C_4$ input of the second sampler 16 |
|---|---|---|
| Q = 1<br>$\phi$ positive | complemented signal | direct signal |
| Q = 0<br>$\phi$ negative | direct signal | complemented signal |

Figure 5:
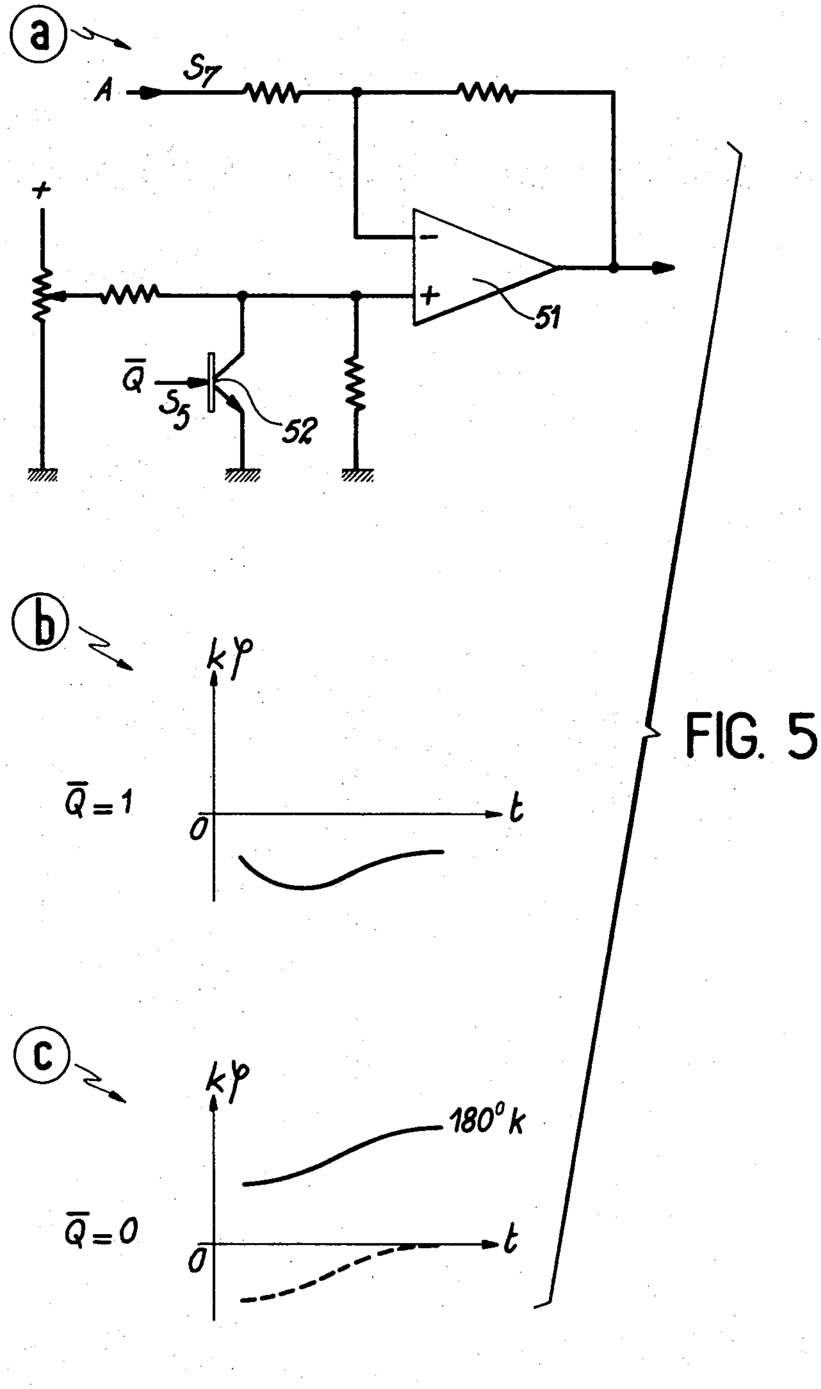
- FIG. 5 is a general diagram of a sign-changing circuit of the phase meter.

The sign-changing circuit 17 of FIG. 1 is shown in detail in FIG. 5. This circuit makes use of an operational amplifier 51 which is mounted as a summing amplifier (as shown in FIG. 5) and is intended to restore the value and the sign of the phase displacement of the signal V $\phi$ to be scanned. When the signal V $\phi$ leads with respect to the reference signal V ref, the value of the voltage of the signal S7 at the output of the second sampler 16 (FIG. 1) becomes: $A = k(180° - \phi)$ and when said signal lags: $A = k\phi$.

The signal S 7 is applied to the negative (reversing) input whilst the voltage corresponding to the height of the sweep waveform (K.180°) is applied to the positive (non-reversing) input which is connected to a transistor 52, said transistor being controlled by the signal S5 derived from the directional logic unit 14 (FIG. 1) in the following manner:

- if the signal is at the level 1, the transistor 52 is saturated and short-circuits the positive input of the amplifier 51 which delivers a voltage $V = -k\,\phi$ at the output.

-if the signal is at the level 0, the transistor 52 is caused to cut-off and the amplifier 51 delivers at the output:

$$V = k(180° - \phi) + k.180° = +k\,\phi$$

The sign of the signal V $\phi$ is therefore restored in the sign-changing circuit 17 (FIG. 1) by the signal S8 as shown in diagrams 5*b* and 5*c* of FIG. 5.

The signal V $\phi$ is also controlled at the input of the circuit of FIG. 1 by a modulus-detecting circuit 19 which detects the peak value of the signal to be scanned. The circuit 19 delivers a signal S9 which is a function of the threshold value of the modulus of V $\phi$.

The two signals S8 and S9 are applied to an analog gate which blocks the output signal S10 when the modulus of the signal V $\phi$ to be scanned is lower than a predetermined value.

Figure 2:
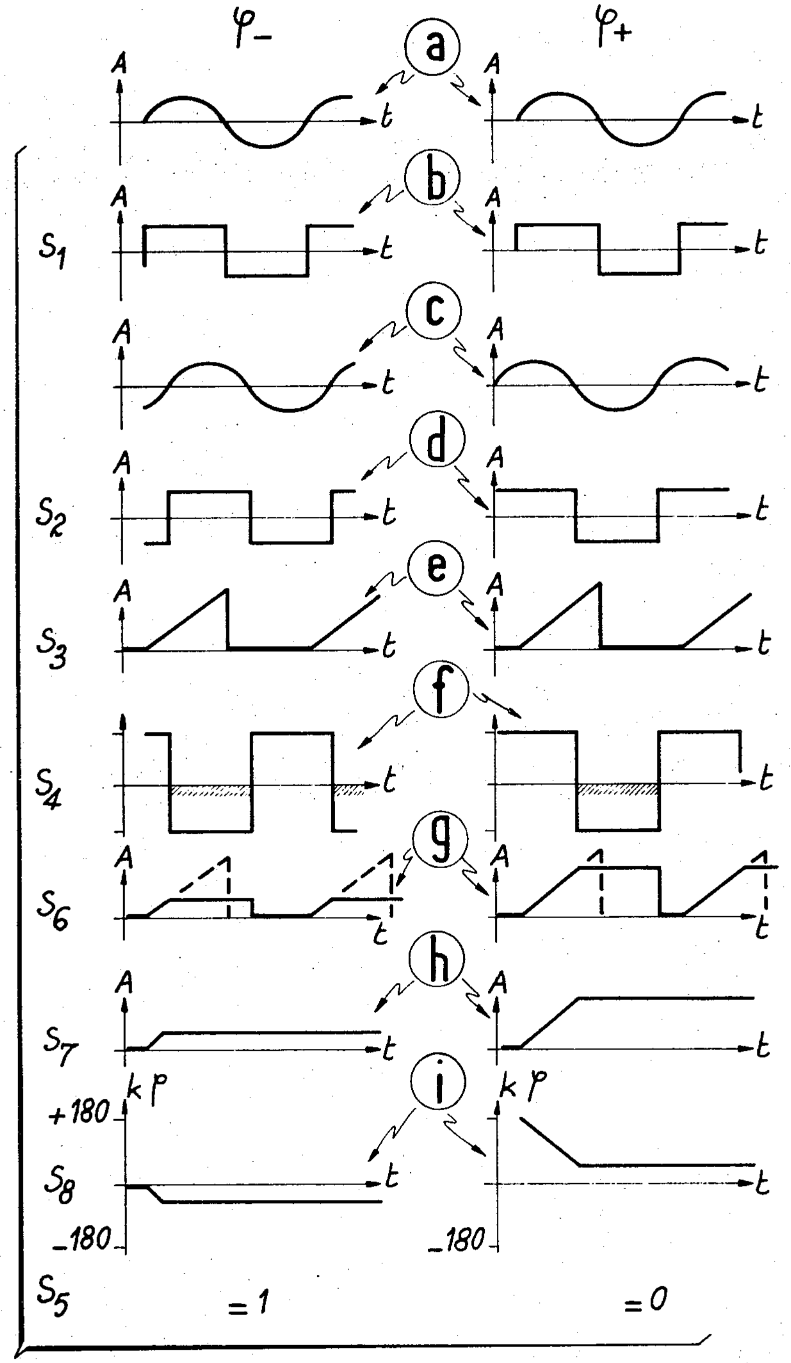
- FIG. 2 shows the operating chronograms of the phase meter.

The operation of the phase meter in accordance with the invention is represented schematically by the chronograms of FIG. 2. The curves are established in respect of a voltage to be scanned which is either in phase lag (left-hand column of FIG. 2) or in phase lead (right-hand column of FIG. 2). Moreover, all the curves of the left-hand column are established with the output signal S5 of the directional logic unit (FIGS. 1 and 4) in state 1 and all the curves of the right-hand column with S5 in state 0.

The curves *a* represent the reference signal V ref at the input of the phase meter in accordance with the invention as derived from a basic circuit (not shown) which is usually employed in eddy-current nondestructive testing instruments. The same applies at *c* in the case of the signal V $\phi$ to be scanned.

The curves *b* and *d* represent respectively the signals $S_1$ and $S_2$ which correspond to V ref and V $\phi$ after shaping in the circuits 11 and 12 of FIG. 1 and such as they are applied to the input of the directional logic unit.

The curves *e* correspond to the sawtooth signal S3 which is produced by the sweep generator of FIGS. 1 and 3 and applied to the first sampler. The curves *f* represent the shape of the sampler-control signal S4: the shaded portions correspond to blocking of the first sampler. The signals S6 and S7 (curves *g* and *h*) correspond to the respective outputs of the first and second samplers. The curves *i* represent the analog signal (S8) corresponding to the signal V $\phi$ to be scanned with the restitution of the sign within a range of + to − 180°.

The inputs of the flip-flop 18 (shown in FIG. 1) are controlled by the signal S9 which is representative of the peak value of the modulus and the signal S8 which is representative of the value and the sign of the phase shift. Said flip-flop is blocked at 0 as long as the signal V $\phi$ to be scanned has not attained a sufficient amplitude.

What we claim is:

1. A high-speed phase meter essentially comprising:

a reference signal source, a source of a signal to be scanned, a sweep waveform generator connected to said reference source controlled by the shaped reference signal, (V ref) a first and a second memory sampler connected to said generator which sample said sweep waveform, a directional logic unit connected to said sources and to said samplers controlled by the reference signal and the shaped signal to be scanned (V$\phi$) which delivers two signals for controlling said samplers and a logical signal for the direction of the phase shift, a sign-changing circuit connected to said logic circuit and to said second sampler controlled by said directional logic unit and by said second sampler so as to deliver an analog signal ($V = \pm k\phi$) which is representative of the value and sign of the phase shift after transition through a sinusoidal cycle between the reference signal (V ref) and the signal (V$\phi$) to be scanned, a modulus detecting circuit connected to said source of signal to be scanned, an analog gate connected to said sign-changing circuit and to said modulus detecting circuit controlled by said analog signal and by a signal from said modulus detecting circuit for controlling the peak of the modulus of the signal to be scanned in order to block the output signal when the modulus is smaller than a predetermined value.

2. A phase meter according to claim 1, wherein the sweep waveform generator is an operational amplifier coupled as an integrator which delivers a sawtooth signal of adjustable and constant amplitude having the same recurrence frequency as the reference signal and a width equal to one half-period of said reference signal.

3. A phase meter according to claim 2, wherein the sawtooth signal is sampled in said first sampler for a period of time corresponding to the phase shift.

4. A phase meter according to claim 1, wherein the directional logic unit comprises a first flip-flop circuit for generating a logical signal which gives the sign of the phase shift and a second exclusive-OR circuit connected to said first flip-flop circuit for giving a direct or complemented signal as a function of the sign of the phase shift as applied to the input of said second circuit.

5. A phase meter according to claim 4, wherein the complemented signal of the direct signal controls said second sampler during the time of closure of said first sampler.

6. A phase meter according to claim 1, wherein said sign-changing circuit is an operational amplifier coupled as a summing amplifier with a negative input and connected to and controlled by a direct-current voltage derived from said second sampler and a positive input controlled by a transistor connected to said operational amplifier and to said logic unit, said transistor receiving the phase-shift signal derived from said directional logic unit.

7. A phase meter according to claim 6, wherein said transistor is saturated and short-circuits the positive input of said amplifier when it is controlled by a phase shift signal in state 1, whereupon said amplifier delivers a voltage $V = -k\phi$.

8. A phase meter according to claim 6, wheerein said transistor cuts-off when controlled by a phase shift signal in state 0, whereupon said amplifier delivers a voltage $V = +k\phi$.

* * * * *